(No Model.)

H. TAYLOR & R. B. SHARP.
WASTE COCK.

No. 296,797. Patented Apr. 15, 1884.

WITNESSES
Paul F. Markoff.
Wm. J. Taylor

Henry Taylor & Richard B. Sharp INVENTORS.
By Geo. C. Tracy
ATTORNEY.

UNITED STATES PATENT OFFICE.

HENRY TAYLOR AND RICHARD B. SHARP, OF CLEVELAND, OHIO.

WASTE-COCK.

SPECIFICATION forming part of Letters Patent No. 296,797, dated April 15, 1884.

Application filed April 26, 1882. Renewed December 21, 1883. (No model.)

*To all whom it may concern:*

Be it known that we, HENRY TAYLOR and RICHARD B. SHARP, of Cleveland, Cuyahoga county, and State of Ohio, have invented a new and useful Improvement in Waste-Cocks; and we do hereby declare that the following is a full, clear, and exact description of the same, reference being made to the accompanying drawings, and to the letters of reference marked thereon.

Our invention relates to certain improvements in waste-cocks, having for its object the production of a cock of such form and construction that it will not be open to the objections commonly urged against those in general use.

Our invention consists in the hereinafter described means for attaining said object.

Figure 1:
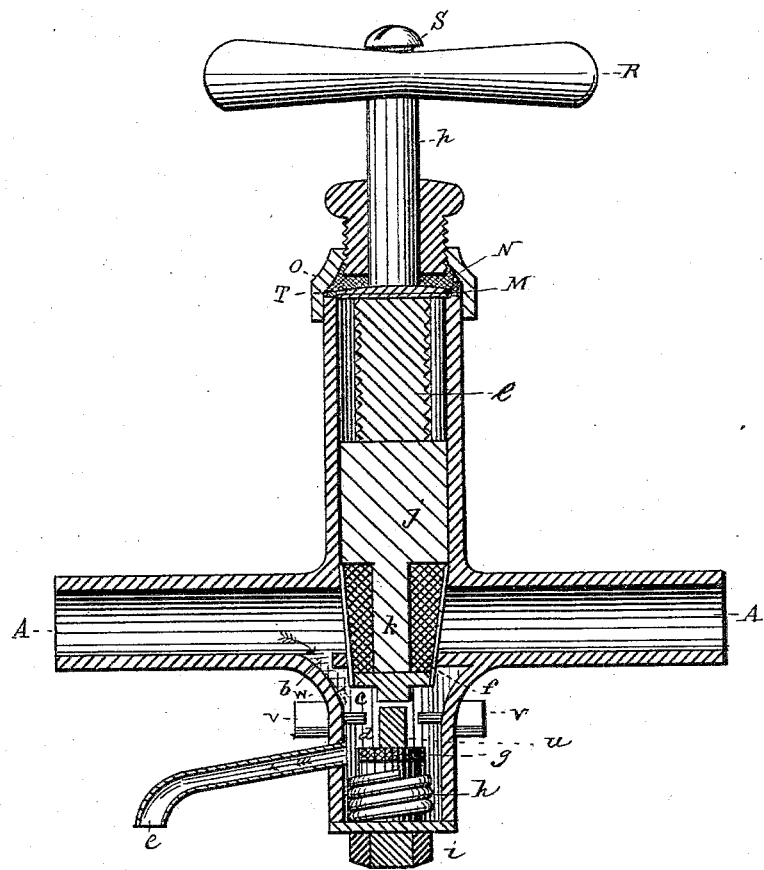
Figure 2:

In the drawings, Figure 1 is a vertical medial section, and Fig. 2 is a detail of piston $u$.

A is the water-way; $b$, the waste-outlet through chamber $c$ $d$.

$e$ is the waste-tube.

$f$ is the rubber plug.

$g$ is the rubber washer in the piston for shutting off waste.

$h$ is a strong spiral spring for automatically closing waste-piston.

$i$ is the reversible bottom of the lower part of waste-chamber, to permit repacking or clearing of the chamber.

$j$ is a brass core carrying the rubber plug $f$, passing through it, as shown at R.

$l$ is a screw, the turning of which raises and lowers core and plug.

M is a brass friction-washer securely holding the working parts in place, as shown.

N is the stuffing-box, and O the cap carrying the same.

$p$ is the piston having the handle R, the screw S holding the handle in position.

T is a rubber washer in top of cock, for brass friction-washer M to turn on.

$u$ is the piston in the waste-chamber which carries the rubber washer $g$.

$v$ is a screw-joint, by means of which the lower part of waste-chamber may be disconnected from the main part of cock.

W is a flanged nut for holding the rubber plug in its place.

The operation of our device is as follows: When the water is turned on by means of the handle R, the rubber plug is raised clear of the water-way, leaving no obstruction whatever to lessen the supply flowing through the pipe. The spring at the bottom of the chamber at the same time raises the washer $g$ and closes the waste completely and firmly. By the reverse operation to shut off the water the rubber plug ascends to its seat and the nut on the flange at the bottom of the rubber plug strikes the piston directly below it, compressing the spring in the lower-chamber to the outlet-tube $e$.

Having thus described our invention, what we claim as new, and desire to secure by Letters Patent, is—

In a waste-cock, the combination of the handle R, plunger $j$, and rubber plug $f$, with washer $g$, and spring $h$, operating in the manner and for the purposes set forth and described.

This specification signed and witnessed this 6th day of April, 1882.

HENRY TAYLOR.
RICHARD B. SHARP.

Witnesses:
PAUL F. MARKOFF,
GEO. C. TRACY.